2,891,052

ANHYDROSORBITYL AMIDES AND PROCESS OF PREPARATION

Fred E. Boettner, Philadelphia, and James L. Rainey, Abington, Pa., assignors to Rohm & Haas Company, Philadelphia, Pa., a corporation of Delaware No Drawing. Application April 10, 1956
Serial No. 577,205

17 Claims. (Cl. 260—211)

This invention concerns anhydrosorbityl amides, and more particularly N-alkyl-N-anhydrosorbityl amides of specific acids, as new compositions of matter and a method for their preparation.

The compounds of this invention may be represented by the formula

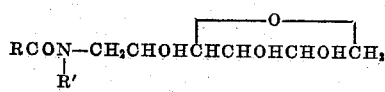

in which R' is an alkyl group of one to four carbon atoms and R is preferably an alkyl or alkenyl group of seven to seventeen carbon atoms.

The present compounds are prepared by reacting an aliphatic carboxylic acid, preferably having the formula RCOOH, in which R has the significance as previously stated, with an alkylglucamine, in which the alkyl portion has already been defined as R', until substantially exactly two molecular equivalents of water are evolved. It is vital to the success of this process that only the stated amount of water be evolved. If only one molecular equivalent of water be evolved, a sorbityl amide is produced that has distinctively different properties and characteristics from the anhydrosorbityl amide of this invention. If more than two molecular equivalents of water are evolved a general molecular degradation occurs which leads to diverse and unpredictable products of little known value. It is, therefore, important that essentially two and only two molecular equivalents of water are evolved during the present process.

It is preferred that the acid reactant be a fatty acid of about eight to eighteen carbon atoms, such as caprylic, capric, undecanoic, hendecenoic, lauric, dodecenoic, tridecanoic, myristic, palmitic, margaric, stearic, oleic, linoleic, linolenic, and the like. There may, also, be employed acids obtained from naturally occurring mixtures such as those from cottonseed oil, cocoanut oil, castor oil, soybean oil, and the like. There may also be used commercial acid mixtures such as tall oil acids. While dicarboxylic acids, such as sebacic, hexadecandioic, dimeric oleic, dimeric linoleic, and the like may be employed, it is preferred to use monocarboxylic acids. Esters of the above acid reactants may not be used or the desired products are not obtained. In the present invention there is no equivalence between acids and esters. The esters simply will not work.

The alkylglucamine reactant may typically be methylglucamine, ethylglucamine, isopropylglucamine, butylglucamine, and the like.

A solvent is not required in the present instance, but is preferred. The use of a volatile inert organic solvent frequently improves the color of the product and aids in determining the amount of water evolved. The solvent, also, serves as an entraining agent. Suitable as volatile inert organic solvents are xylene, benzene, toluene, nonane, decane, kerosene, and the like, which may be readily removed from the product at the end of the reaction, such as by evaporation or stripping, preferably at reduced pressures.

Temperatures in the range of about 135° to 200° C. are advantageously employed. It is frequently convenient to conduct the present reaction at the reflux temperature, provided such temperature is not appreciably above 200° C.

Reaction times of ten to thirty hours and more are contemplated. Actually, the time of complete reaction is best expressed in terms of the result desired. As previously mentioned the present method must be continued until substantially exactly two molecular equivalents of water have been liberated. The water is evolved in two distinct successive phases. The first molecular equivalent of water is evolved usually in about three to five hours, depending on the specific reactants used and the temperatures employed, and then apparently nothing readily observable happens for an appreciable interim period before the second equivalent of water is liberated. It is important to note the discontinuous nature of the process for even one skilled in the art might reasonably assume that the reaction was complete after the first equivalent of water is freed, without the benefit of the present teaching.

It is preferred to employ the reactants in equimolar proportions since they react substantially in those relative amounts. Either reactant may be added to the other or they may both be mixed simultaneously with equally satisfactory results. An excess of one of the reactants does not appreciably expedite matters and such is not desirable because the attending problems of purification thereby created outweigh any benefits obtained. However, an excess of one of the reactants may be used, if desired. In such an instance the product is isolated by first stripping the reaction mixture of solvent. The mixture is then taken up with butanol and washed with either aqueous dilute mineral acid or aqueous 5% sodium chloride solution to remove any excess amine. The butanol is then removed by stripping. If the acid is in excess, the reaction mixture is stripped of solvent, if any were used, and extracted with heptane to remove the excess acid. If the reactants are used in equimolar amounts, as is the preferred way, the product is isolated by merely removing the solvent such as by evaporation or by distillation, preferably under reduced pressure.

The present reaction leads to substantially quantitative results. The products are waxy solids or semi-solids that range from white to tan in color. The present products are believed to have the structure

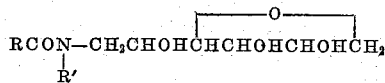

It is known from molecular weight determinations that the product is the result of intramolecular dehydration rather than intermolecular dehydration of two molecules. The exact formula employed is the most feasible from theoretical considerations. In any case, the products obtained are new and valuable compositions of matter.

The products of this invention are useful as corrosion inhibitors in aqueous systems. For instance, in a standard test involving an aqueous 10% hydrochloric acid system, the present compounds in amounts as low as 0.4% by weight, were able to retard and substantially eliminate rust on iron.

These products, while producing generous foam of fair to good stability, are excellent foam stabilizers for commercial detergents of the alkylarylsulfonate type particularly in 50-50 mixtures, wherein ultimate aqueous solutions of as little as 0.1% of the detergent blend give good stable foam and satisfactory detergency. The products of this invention are valuable detergents particularly for glass, steel, and nylon, and are effective in preventing, to a high degree, soil redeposition, particularly with regard to nylon.

The unique characteristics of the instant products are their constant viscosities in aqueous solutions of 10 to 20% and their remarkable stability in built detergent formulations. In many commercial applications it is necessary to provide relatively viscous aqueous solutions of about 10 to 20% of the detergent wherein the viscosity of the solution is constant and of such a nature that the solution may be handled, formulated, and used conveniently. The present compounds provide such solutions, which have essentially constant viscosities in the range of about 130 to 275 centipoises measured at 25° C. If the present reaction had been interrupted after only one molecular equivalent of water had been evolved and the product thus obtained, an N-alkyl-N-sorbitylalkamide, made into aqueous solutions highly irregular viscosities are obtained. The N-alkyl-N-sorbitylalkanamides give viscosities, in 10 to 20% aqueous solutions, that start at about 150 centipoises measured at 25° C. and abruptly increase to values above 5,000 and upward to 15,000 centipoises and some are so high as to be immeasurable. These undesirable characteristics of the N-alkyl-N-sorbitylalkanamides prevent their use in many commercial applications and, also, serve to illustrate the distinct physical and chemical differences between the N-alkyl-N-sorbitylalkanamides and the products of this invention.

The N-alkyl-N-anhydrosorbitylalkanamides of this invention are valuable detergents that readily lend themselves to conventional building formulations. The present compounds may be formulated, as desired, with sodium silicate, sodium borate, sodium tripolyphosphate, tetrapotassium pyrophosphate, sodium carbonate, and the like, to provide stable formulations of excellent detergent characteristics. Attempts to similarly employ compounds formed by reacting an alkylglucamine with an alkyl ester of a fatty acid have failed because these compounds are so salt sensitive that attempted formulations result in their stratification and precipitation, which leads to an unacceptable heterogeneous system unsuited for practical applications. It has been stated previously that only acid reactants may be used in the instant invention and not the corresponding esters. Compounds obtained by using the ester reactants are not the same nor do they have the same physical and chemical properties as the products of this invention as indicated by their behavior in built aqueous detergent systems.

The outstanding utility of the present compounds in commercial detergent applications is due to the unexpected concurrence of properties that yields aqueous solutions of commercial concentrations that have stable viscosities and lend themselves to building with known builders to produce valuable formulations.

The products of this invention, as well as the method for their preparation, may be more fully understood from the following examples which are offered by way of illustration and not by way of limitation. Parts by weight are used throughout.

*Example 1*

Into a three-necked flask, equipped with a thermometer, a stirrer, a reflux condenser, and a water separator between the flask and the condenser, there is put 100 parts of lauric acid. The temperature is raised to 70° C. in order to melt the acid. There is then added 50 parts of N-methylglucamine while the mixture is stirred. There is introduced 200 parts of xylene and then 47.5 additional parts of N-methylglucamine. The mixture is then heated to reflux at 140° to 150° C. for about twelve hours during which time two molecular equivalents of water are collected in the water separator. The reaction mixture is transferred to a stripping dish and the xylene removed under reduced pressure (water pump) on the steam bath. The product is a tan waxy semisolid in a 100% yield. The product contains 3.9% nitrogen (3.9% theoretical), is identified as N-methyl-N-anhydrosorbityllauramide, and corresponds to the formula $$C_{11}H_{23}CON CH_2CHOHCHCHOHCHOHCH_2$$
$$\phantom{C_{11}H_{23}CONCH_2CHOH}\underset{CH_3}{|}\phantom{CHCHOHCHOHCH_2}\overline{\phantom{CHCHOHCHOHCH_2O}}$$

In a similar manner, from oleic and N-butylglucamine, there is made N-butyl-N-anhydrosorbityloleamide.

*Example 2*

There is added to a reaction vessel 266 parts of cocoanut oil fatty acids (acid number—266, molecular weight—211) and heat is applied until the acids melt. There is then added 120 parts of N-methylglucamine, and then 200 parts of xylene. There is finally introduced 125.7 additional parts of N-methylglucamine and the temperature of the mixture is raised to reflux (140° to 155° C.). The reaction is continued for about eighteen hours during which time two molecular equivalents of water are evolved. The xylene was removed by stripping under reduced pressure leaving the tan waxy semisolid product. The product contains 3.7% nitrogen (3.78% theoretical) and corresponds to the N-methyl-N-anhydrosorbitylamide of cocoanut oil fatty acids.

There are prepared in like manner, from tall oil acids and N-isopropylglucamine, the N-isopropyl-N-anhydrosorbitylamide of tall oil acids, and from N-methylglucamine and cottonseed oil fatty acids, the N-methyl-N-anhydrosorbitylamide of cottonseed oil fatty acids.

*Example 3*

There are added to a reaction vessel 104 parts of capric acid and 118 parts of N-methylglucamine. The temperature is increased to melt the reactants and then 300 parts of xylene is added. The mixture is refluxed at 140° to 145° C. for twenty-seven hours during which time two molecular equivalents of water are collected in the water separator. The xylene is removed under reduced pressure leaving the light amber waxy semisolid product in a 100% yield. The product contains 4.1% nitrogen (4.23% theoretical) and is identified as N-methyl-N-anhydrosorbitylcapramide.

Using a like procedure there were made N-ethyl-N-anhydrosorbityldodecenamide, from N-ethylglucamine and dodecenoic acid, and N-butyl-N-anhydrosorbitylcaprylamide.

*Example 4*

There are put into a reaction vessel 104.5 parts of N-ethylglucamine and 160 parts of stearic acid. The reactants are heated until molten and then 250 parts of nonane is introduced. The mixture is heated at reflux until two molecular equivalents of water are evolved. The nonane is stripped off and the residue taken up in water. The excess stearic acid is removed by extracting with heptane. Residual heptane is removed by evaporation leaving a tan product that is identified as N-ethyl-N-anhydrosorbitylstearamide.

By employing a similar procedure there are made N-methyl-N-anhydrosorbityllinoleamide, from N-methylglucamine and linoleic acid, and N-ethyl-N-anhydrosorbitylpalmitamide, from N-ethylglucamine and palmitic acid..

We claim:

1. As a new composition of matter, an N-lower alkyl-N-anhydrosorbitylamide of an aliphatic carboxylic acid that contains from eight to eighteen carbon atoms, said composition having the formula $$RCON—CH_2CHOHCHCHOHCHOHCH_2$$
$$\phantom{RCON}\underset{R'}{|}\phantom{CH_2CHOHCHCHOHCHOHCH_2O}\overline{\phantom{—CH_2CHOHCHCHOHCHOHCH_2O}}$$

in which R' is an alkyl group of one to four carbon atoms and R is a member of the class consisting of alkyl and alkenyl groups of seven to seventeen carbons.

2. As a new composition of matter, an N-lower alkyl-

N-anhydrosorbitylamide of a fatty acid that contains from eight to eighteen carbon atoms, said composition having the formula

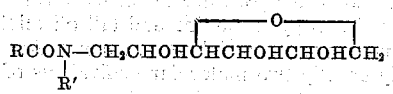

in which R' is an alkyl group of one to four carbon atoms and R is a residue of a fatty acid, said residue containing from seven to seventeen carbon atoms.

3. As a new composition of matter, an N-methyl-N-anhydrosorbitylamide of a fatty acid that contains from eight to eighteen carbon atoms, said composition having the formula

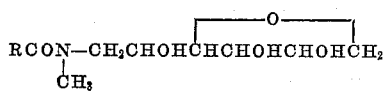

in which R is a residue of a fatty acid, said residue containing from seven to seventeen carbon atoms.

4. As a new composition of matter, N-methyl-N-anhydrosorbityllauramide having the formula

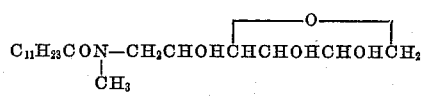

5. As a new composition of matter, N-ethyl-N-anhydrosorbitylstearamide having the formula

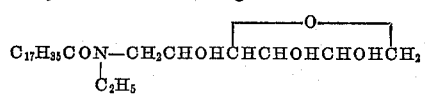

6. As a new composition of matter, N-methyl-N-anhydrosorbityllinoleamide having the formula

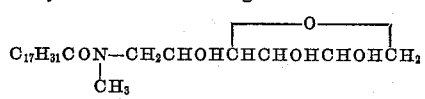

7. As a new composition of matter, N-methyl-N-anhydrosorbitylamide of cocoanut oil fatty acids having the formula

in which R is the residue of coconut oil fatty acids.

8. As a new composition of matter, N-isopropyl-N-anhydrosorbitylamide of tall oil aliphatic acids having no more than eighteen carbon atoms having the formula

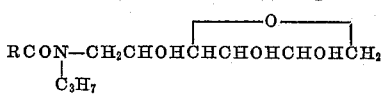

in which R is the residue of tall oil aliphatic acids.

9. A method for the preparation of N-lower-alkyl-N-anhydrosorbitylamide of an aliphatic carboxylic acid having the formula

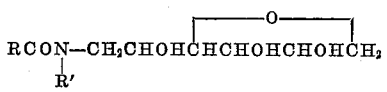

in which R' is an alkyl group of one to four carbon atoms and R is a member from the class consisting of alkyl and alkenyl groups containing from seven to seventeen carbon atoms which comprises heating an N-lower alkylglucamine with an aliphatic carboxylic acid containing from eight to eighteen carbon atoms until substantially exactly two molecular equivalents of water are evolved.

10. A method for the preparation of N-lower alkyl-N-anhydrosorbitylamide of a fatty acid having the formula

in which R' is an alkyl group of one to four carbon atoms and R is a residue of a fatty acid, said residue containing from seven to seventeen carbon atoms which comprises heating an N-lower alkylglucamine with a fatty acid containing from eight to eighteen carbon atoms until substantially exactly two molecular equivalents of water are evolved.

11. A method for the preparation of N-lower alkyl-N-anhydrosorbitylamide of a fatty acid having the formula

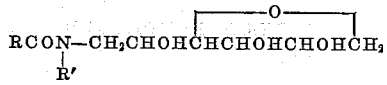

in which R' is an alkyl group of one to four carbon atoms and R is a residue of a fatty acid, said residue containing from seven to seventeen carbon atoms which comprises heating at the reflux temperature in the presence of an inert volatile organic solvent an N-lower alkylglucamine with a fatty acid containing from eight to eighteen carbon atoms until substantially exactly two molecular equivalents of water are evolved.

12. A method for the preparation of N-lower alkyl-N-anhydrosorbitylamide of a fatty acid having the formula

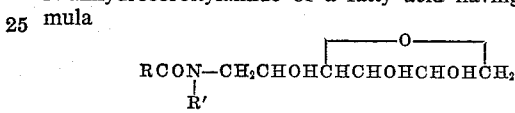

in which R' is an alkyl group of one to four carbon atoms and R is a residue of a fatty acid, said residue containing from seven to seventeen carbon atoms which comprises heating in the range of about 135° to 200° C. and in the presence of an inert volatile organic solvent, an N-lower alkylglucamine with a fatty acid containing from eight to eighteen carbon atoms until substantially exactly two molecular equivalents of water are evolved.

13. A method for the preparation of N-methyl-N-anhydrosorbityllauramide having the formula

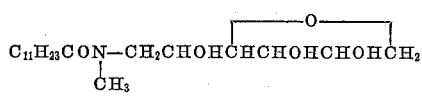

which comprises heating at a temperature of about 135° to 200° C. and in the presence of an inert volatile organic solvent N-methylglucamine and lauric acid until substantially exactly two molecular equivalents of water are evolved.

14. A method for the preparation of N-ethyl-N-anhydrosorbitylstearamide having the formula

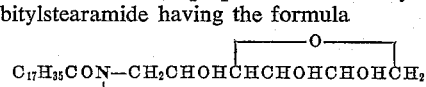

which comprises heating at a temperature of about 135° to 200° C. and in the presence of an inert volatile organic solvent N-ethylglucamine and stearic acid until substantially exactly two molecular equivalents of water are evolved.

15. A method for the preparation of N-methyl-N-anhydrosorbityllinoleamide having the formula

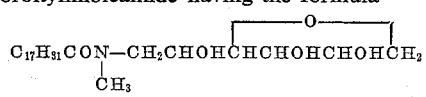

which comprises heating at a temperature of about 135° to 200° C. and in the presence of an inert volatile organic solvent N-methylglucamine and linoleic acid until substantially exactly two molecular equivalents of water are evolved.

16. A method for the preparation of N-methyl-N-anhydrosorbitylamide of cocoanut oil fatty acids having the formula

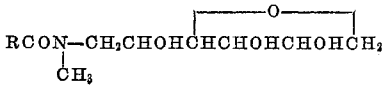

in which R is the residue of coconut oil fatty acids which comprises heating at a temperature of about 135° to 200° C. and in the presence of an inert volatile organic solvent N-methylglucamine and cocoanut oil fatty acids until substantially exactly two molecular equivalents of water are evolved.

17. A method for the preparation of N-isopropyl-N-anhydrosorbitylamide of tall oil acids having the formula

in which R is the residue of tall oil aliphatic acids which comprises heating at a temperature of about 135° to 200° C. and in the presence of an inert volatile organic solvent N-isopropylglucamine and tall oil aliphatic acids having no more than eighteen carbon atoms until substantially exactly two molecular equivalents of water are evolved.

References Cited in the file of this patent

UNITED STATES PATENTS

| | | |
|---|---|---|
| 1,985,424 | Piggott | Dec. 25, 1934 |
| 2,703,798 | Schwartz | Mar. 8, 1955 |